United States Patent
Fujii

(10) Patent No.: US 11,629,993 B2
(45) Date of Patent: Apr. 18, 2023

(54) MEASUREMENT TERMINAL, MEASUREMENT SYSTEM, MEASUREMENT METHOD, AND PROGRAM

(71) Applicant: PANASONIC INTELLECTUAL PROPERTY MANAGEMENT CO., LTD., Osaka (JP)

(72) Inventor: Ryota Fujii, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 14 days.

(21) Appl. No.: 17/255,279

(22) PCT Filed: Mar. 13, 2019

(86) PCT No.: PCT/JP2019/010422
§ 371 (c)(1),
(2) Date: Apr. 8, 2021

(87) PCT Pub. No.: WO2020/003635
PCT Pub. Date: Jan. 2, 2020

(65) Prior Publication Data
US 2021/0262853 A1 Aug. 26, 2021

(30) Foreign Application Priority Data
Jun. 27, 2018 (JP) .............................. JP2018-121556

(51) Int. Cl.
*G01H 9/00* (2006.01)
*G01H 3/00* (2006.01)
*G01H 11/06* (2006.01)

(52) U.S. Cl.
CPC ............. *G01H 9/002* (2013.01); *G01H 3/005* (2013.01); *G01H 11/06* (2013.01)

(58) Field of Classification Search
CPC ......... G01H 9/002; G01H 3/005; G01H 11/06
(Continued)

(56) References Cited

U.S. PATENT DOCUMENTS

| 4,165,458 A | 8/1979 | Koizumi et al. |
| 2016/0282224 A1 | 9/2016 | Takada et al. |

FOREIGN PATENT DOCUMENTS

| CN | 101614583 | 12/2009 |
| CN | 102243143 | 11/2011 |

(Continued)

OTHER PUBLICATIONS

International Search Report (ISR) from International Searching Authority (Japan Patent Office) in International Pat. Appl. No. PCT/JP2019/010422, dated Jun. 11, 2019, together with an English language translation thereof.
(Continued)

*Primary Examiner* — Daniel L Murphy
(74) *Attorney, Agent, or Firm* — Greenblum & Bernstein, P.L.C.

(57) ABSTRACT

A measurement terminal includes: a storage that stores, for each of one or more inspection objects, setting information including a parameter related to a feature of an inspection and an abnormality; a processor; and a memory having instructions that, when executed by the processor, cause the processor to perform operations. The operations include: acquiring audio data of sound from an inspection object; deriving, based on the setting information of a corresponding one of the one or more inspection objects, a required time for acquiring the audio data of sound from the inspection object to be used for determining a presence or absence of the abnormality in the inspection object; and determining the presence or absence of the abnormality in the inspection
(Continued)

object based on the audio data of sound from the inspection object for the derived required time.

20 Claims, 8 Drawing Sheets

(58) Field of Classification Search
USPC .......................................................... 367/7
See application file for complete search history.

(56) References Cited

FOREIGN PATENT DOCUMENTS

| | | |
|---|---|---|
| JP | 52-129541 | 10/1977 |
| JP | S58-108419 | 6/1983 |
| JP | 08-122305 | 5/1996 |
| JP | 11-173909 | 7/1999 |
| JP | H11-326035 | 11/1999 |
| JP | 2002-181038 | 6/2002 |
| JP | 2004-361286 | 12/2004 |
| JP | 2012-078288 | 4/2012 |
| JP | 2015-114214 | 6/2015 |

OTHER PUBLICATIONS

Written Opinion (WO) from International Searching Authority (Japan Patent Office) in International Pat. Appl. No. PCT/JP2019/010422, dated Jun. 11, 2019, together with an English language translation thereof.

FIG. 7

| INSPECTION OBJECT | PRODUCT | COEFFICIENT α | COEFFICIENT β | MEASUREMENT TIME Tm (SECOND) |
|---|---|---|---|---|
| AIR CONDITIONING FAN | AAA | 1 | 5 | 50 |
| | BBC | 0.5 | 1 | 5 |
| COMPRESSOR | KMK | 0.5 | 1 | 5 |
| | MMM | 1 | 4 | 40 |
| HEAT PUMP | PPP | 0.2 | 2 | 4 |
| ... | ... | ... | ... | ... |

90

MEASUREMENT TERMINAL, MEASUREMENT SYSTEM, MEASUREMENT METHOD, AND PROGRAM

TECHNICAL FIELD

The present disclosure relates to a measurement terminal, a measurement system, a measurement method and a program for acquiring audio data of an inspection object.

BACKGROUND ART

Patent Literature 1 discloses an abnormality determination apparatus that performs a time axis waveform analysis in which a time axis waveform is obtained from measurement data measured by a measurement sensor (for example, an acceleration sensor) attached to a product that includes a vibrating unit such as a motor or a compressor and analyzed, and a frequency axis waveform analysis in which a frequency axis waveform is obtained and analyzed in parallel. This abnormality determination apparatus determines an abnormality in the product from a comprehensive determination result of the time axis waveform analysis and the frequency axis waveform analysis.

CITATION LIST

Patent Literature

Patent Literature 1: JP-A-H11-173909

SUMMARY OF INVENTION

Technical Problem

However, in Patent Literature 1, a data block in which measurement data from the measurement sensor attached to the product that includes the vibration unit is fixed at 1024 points, for example, is used every time an abnormality is determined. Therefore, in order to quickly determine the presence or absence of an abnormality in the inspection object, a problem that the measurement data in which period of time is needed is not considered. Therefore, in the configuration of Patent Literature 1, there is a problem that it is difficult to quickly and efficiently determine the presence or absence of an abnormality in the inspection object.

The present disclosure has been made in view of the above situation in the related art, and an object thereof is to provide a measurement terminal, a measurement system, a measurement method, and a program that, in consideration of respective features of an inspection and an abnormality of an inspection object, derive an appropriate measurement time of measurement data for determining the presence or absence of an abnormality, and support rapid and efficient determination of the presence or absence of an abnormality.

Solution to Problem

The present disclosure provides a measurement terminal including: an acquisition unit configured to acquire audio data of sound from an inspection object; a memory configured to store, for each inspection object, setting information including a parameter related to a feature of an inspection and an abnormality in the inspection object; a derivation unit configured to derive, based on the setting information corresponding to the inspection object, a required time for acquiring the audio data of sound from the inspection object to be used for determining a presence or absence of the abnormality in the inspection object; and an analysis unit configured to determine the presence or absence of the abnormality in the inspection object based on the audio data of sound from the inspection object for the derived required time.

Further, the present disclosure provides a measurement system including: a measurement terminal including an acquisition unit that is configured to acquire audio data of sound from an inspection object, and a first communication unit configured to transmit the acquired audio data of sound from the inspection object and an analysis instruction of the audio data and receive a determination result of a presence or absence of an abnormality based on the audio data of sound from the inspection object, the measurement terminal being configured to display the determination result on a display; and an analysis device including a second communication unit that is configured to receive the audio data of sound from the inspection object and the analysis instruction from the measurement terminal and transmit the determination result to the measurement terminal. The analysis device further includes a memory configured to store, for each inspection object, setting information including a parameter related to a feature of an inspection and an abnormality in the inspection object, a derivation unit configured to derive, based on the setting information corresponding to the inspection object, a required time for acquiring the audio data of sound from the inspection object to be used for determining the presence or absence of the abnormality in the inspection object, and an analysis unit configured to determine the presence or absence of the abnormality in the inspection object based on the audio data of sound from the inspection object for the derived required time.

Further, the present disclosure provides a measurement method including: a step of acquiring audio data of sound from an inspection object; a step of storing, in a memory, setting information including a parameter related to a feature of an inspection and an abnormality in the inspection object for each inspection object; a step of deriving, based on the setting information corresponding to the inspection object, a required time for acquiring the audio data of sound from the inspection object to be used for determining a presence or absence of the abnormality in the inspection object; and a step of determining the presence or absence of the abnormality in the inspection object based on the audio data of sound from the inspection object for the derived required time.

Further, the present disclosure provides a program that causes a measurement terminal, which is a computer, to execute: a step of acquiring audio data of sound from an inspection object; a step of storing, in a memory, setting information including a parameter related to a feature of an inspection and an abnormality in the inspection object for each inspection object; a step of deriving, based on the setting information corresponding to the inspection object, a required time for acquiring the audio data of sound from the inspection object to be used for determining a presence or absence of the abnormality in the inspection object; and a step of determining the presence or absence of the abnormality in the inspection object based on the audio data of sound from the inspection object for the derived required time.

Further, the present disclosure provides a program that causes an analysis device, which is a computer and configures a measurement system together with a measurement terminal, the measurement terminal being configured to acquire audio data of sound from an inspection object, transmit the acquired audio data of sound from the inspection object and an analysis instruction of the audio data, receive a determination result of a presence or absence of an abnormality based on the audio data of sound from the inspection object, and display the determination result on a display, to execute: a step of receiving the audio data of sound from the inspection object and the analysis instruction of the audio data of sound from the measurement terminal; a step of storing, in a memory, setting information including a parameter related to a feature of an inspection and the abnormality in the inspection object for each inspection object; a step of deriving, based on the setting information corresponding to the inspection object, a required time for acquiring the audio data of sound from the inspection object to be used for determining the presence or absence of the abnormality in the inspection object; a step of determining the presence or absence of the abnormality in the inspection object based on the audio data of sound from the inspection object for the derived required time; and a step of transmitting the determination result of the presence or absence of the abnormality based on the audio data of sound from the inspection object to the measurement terminal.

Advantageous Effects of Invention

According to the present disclosure, an appropriate measurement time of the measurement data for determining the presence or absence of the abnormality can be derived, and rapid and efficient determination of the presence or absence of the abnormality can be supported in consideration of the respective features of the inspection and the abnormality of the inspection object.

BRIEF DESCRIPTION OF DRAWINGS

FIG. 7 is a table illustrating an example of registered contents in a parameter table.

DESCRIPTION OF EMBODIMENTS

Hereinafter, an embodiment specifically disclosing a measurement terminal, a measurement method, and a program according to the present disclosure will be described in detail with reference to the accompanying drawings. However, an unnecessarily detailed description may be omitted. For example, a detailed description of a well-known matter or a repeated description of substantially the same configuration may be omitted. This is to avoid unnecessary redundancy in a following description and to facilitate understanding by those skilled in the art. The accompanying drawings and the following description are provided for a thorough understanding of the present disclosure by those skilled in the art, and are not intended to limit a subject matter recited in the claims.

Figure 1:
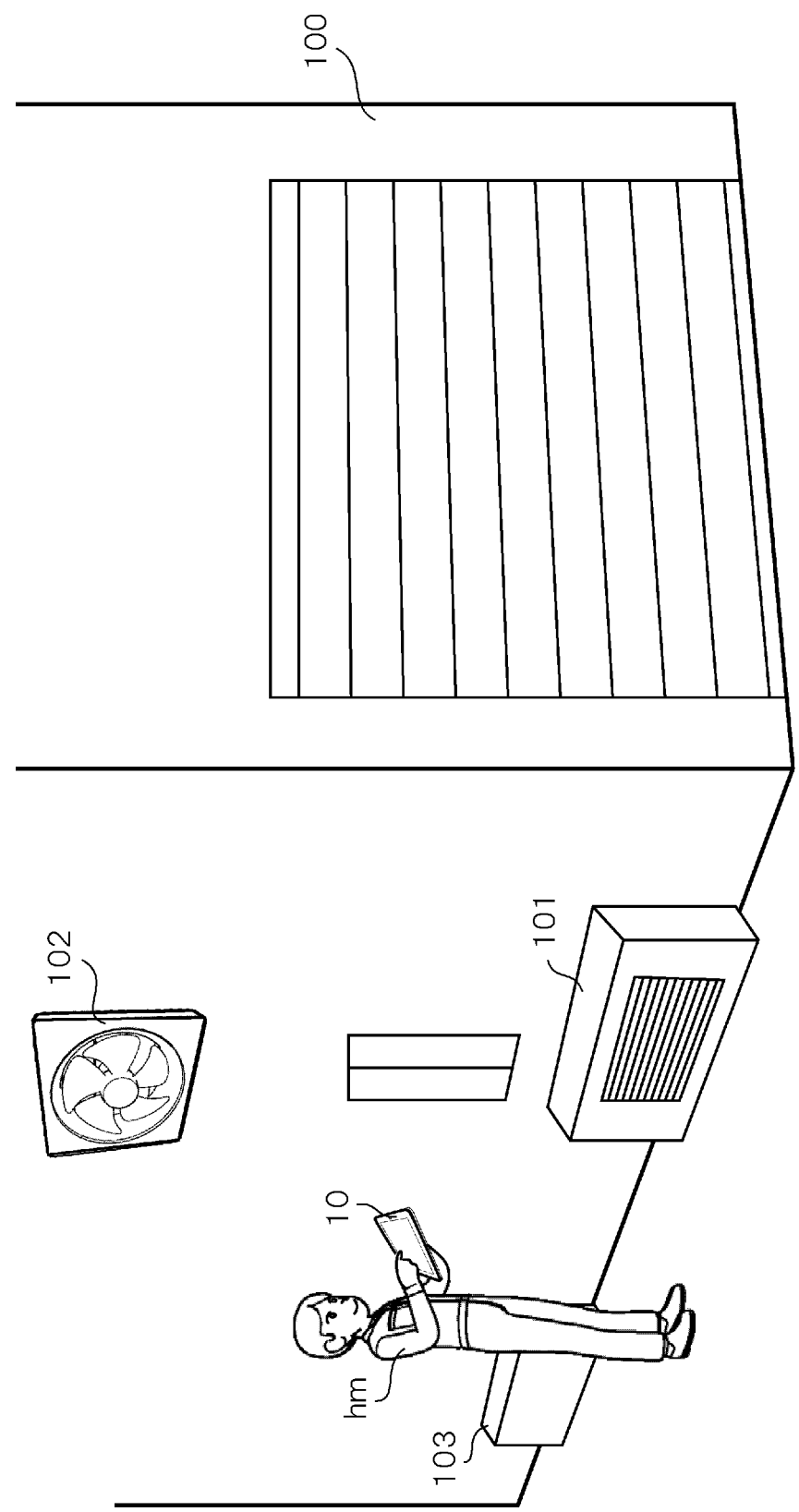
FIG. 1 is a diagram illustrating a usage situation example during an inspection in a sound inspection system according to a first embodiment.

FIG. 1 is a diagram illustrating a usage situation example during an inspection in a sound inspection system 5 not shown in FIG. 1) according to a first embodiment. The inspection object to be inspected by the sound inspection system 5 is, for example, a product that emits a vibration sound. For example, in a building 100 such as a factory or a commercial facility, many inspection objects such as an air conditioning fan 102, a compressor 101, and a heat pump 103 for an electric water heater are installed. The products, which are the inspection objects, are not limited to these devices, but may be various products that emit the vibration sound, such as generators, elevators, automatic doors, vacuum cleaners, and forklifts.

An inspector hm periodically goes around the inspection objects and measures the vibration sound emitted from the inspection object using a measurement terminal 10. In a usage situation illustrated in FIG. 1, the inspector hm holds the measurement terminal 10 over the compressor 101 installed on a ground adjacent to the building 100, and measures the vibration sound emitted from the compressor 101 In addition, the inspector hm approaches the air conditioning fan 102 attached to a wall surface of the building 100 and the heat pump 103 adjacent to a fuel supply tank, directs the measurement terminal 10 at each of the air conditioning fan 102 and the heat pump 103, and measures the vibration sound emitted from each of the air conditioning fan 102 and the heat pump 103.

Figure 2:
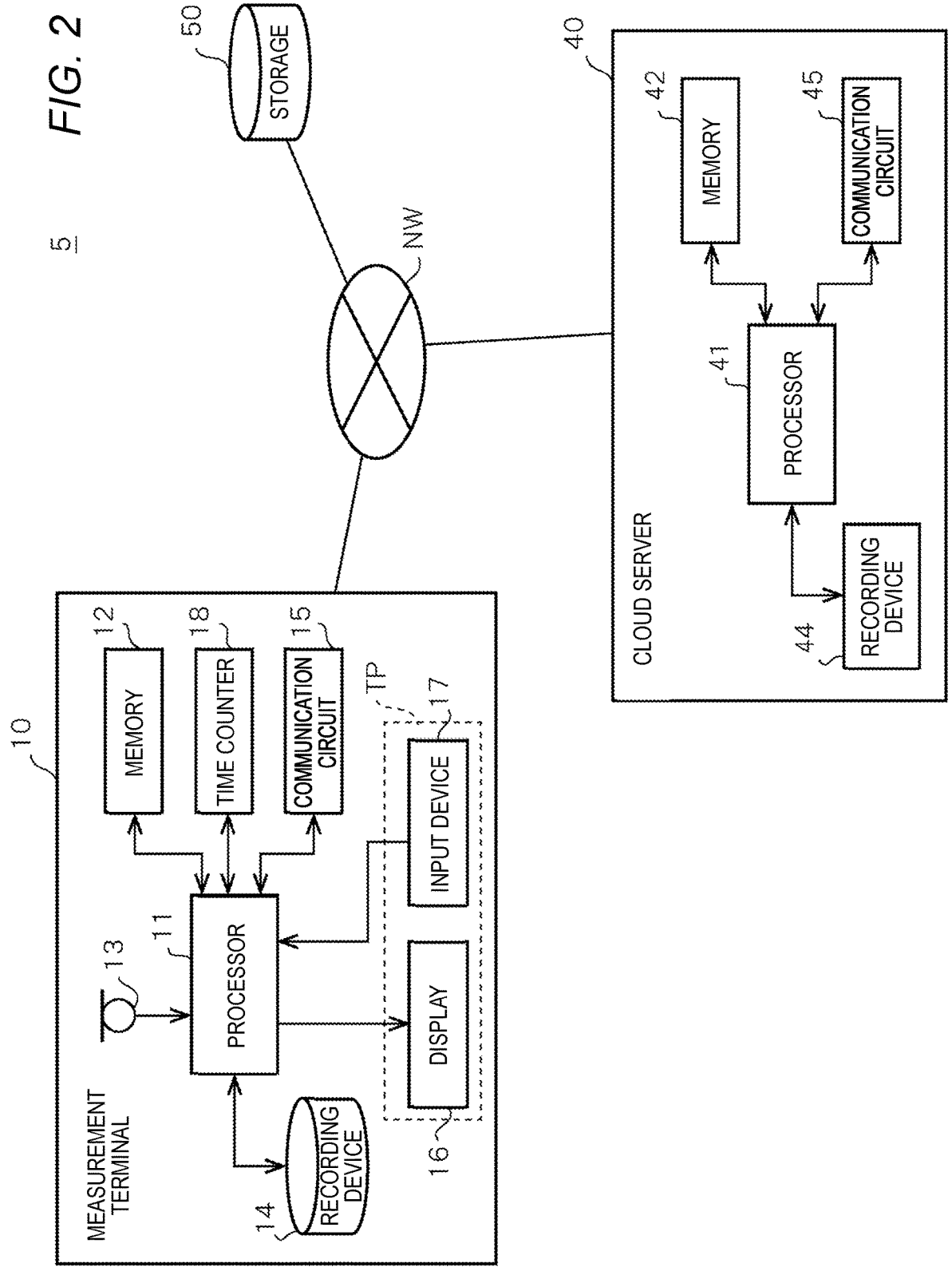
FIG. 2 is a block diagram illustrating a hardware configuration example of the sound inspection system according to the first embodiment.

FIG. 2 is a block diagram illustrating a hardware configuration example of the sound inspection system 5 according to the first embodiment. The sound inspection system 5 includes the measurement terminal 10, a cloud server 40, and a storage 50. The measurement terminal 10, the cloud server 40, and the storage 50 are communicably connected to each other via a network NW.

The measurement terminal 10 includes a processor 11, a memory 12, a microphone 13, a recording device 14, a communication circuit 15, a display 16, an input device 17, and a timer counter 18.

The processor 11 activates a measurement time calculation application stored in the memory 12, and calculates a measurement time of a sound to be collected by the microphone 13 during an execution of the measurement time calculation application when the inspection object is inspected. Further, the processor 11 activates an inspection application stored in the memory 12, and performs an inspection operation of the inspection object during execution of the inspection application. The processor 11 is configured by using, for example, a central processing unit (CPU), a microprocessor unit (MPU), a digital signal processor (DSP), or a field-programmable gate array (FPGA), or the like.

The memory 12 includes a random access memory (RAM), and temporarily stores audio data of sound collected by the microphone 13. The memory 12 includes a read only memory (ROM), and stores programs and data of the measurement time calculation application and the inspection application.

The microphone 13 collects the vibration sound emitted from the inspection object, generates the audio data, and outputs the audio data to the processor 11. The microphone 13 may be, for example, a non-directional microphone or a directional microphone. As the microphone 13, for example, a dynamic microphone (moving coil type, ribbon type), a condenser microphone (for example, an electric condenser microphone (ECM)), or the like are used.

The recording device 14 (an example of a memory) stores normal audio data and abnormal audio data to be compared with the measured audio data. The recording device 14 stores a parameter table 90 in which different parameters and a different measurement time are registered for each inspection object. The recording device 14 includes, for example, a solid state drive (SSD), a hard disk drive (HDD), a rewritable ROM (for example, an electrically erasable programmable read-only memory (EEPROM)), or the like.

The communication circuit 15 is connected to the network NW via, for example, a wireless local area network (LAN), a mobile communication network (for example, a cellular network such as a fourth generation mobile communication system (4G) or a fifth generation mobile communication system (5G)), and can communicate with the cloud server 40 or the storage 50.

The display 16 is implemented by a display device such as a liquid crystal display, an organic electroluminescence (EL), or a plasma display. The display 16 displays a setting screen which allows setting of setting information for each inspection object.

The input device 17 receives an operation performed by the inspector hm, for example, when setting the setting information for each inspection object. The input device 17 includes, for example, a mouse, a track ball, a keyboard, a touch pad, or the like. Here, the display 16 and the input device 17 are integrally configured as a touchscreen TP.

The timer counter 18 is a down timer that subtracts (counts down) a preset value set by the processor 11 with the passage of time. The configuration of the timer counter 18 may be implemented by software in the processor 11.

The cloud server 40 is communicably connected to the measurement terminal 10 or the like via the network NW. The cloud server 40 stores the audio data transmitted from the measurement terminal 10 in an internal memory (not illustrated), and analyzes audio data using the audio data stored in the internal memory or audio data stored in the storage 50. The cloud server 40 includes a processor 41, a memory 42, a recording device 44, and a communication circuit 45. Details of each unit will be described later in a second modification.

The storage 50 is connected to the measurement terminal 10 and the cloud server 40 via the network NW, and stores a huge amount of audio data transmitted from the measurement terminal 10 and other devices.

The network NW is the Internet, a wired local area network (LAN), or the like, and communicably connects various devices.

Next, an operation of the sound inspection system 5 according to the first embodiment will be described.

The sound inspection system 5 determines the presence or absence of an abnormality in the inspection object based on the vibration sound emitted from the product, which is the inspection object. The vibration sound emitted from the inspection object includes a vibration sound which is an abnormal sound and a vibration sound which is a normal sound.

Figure 3:
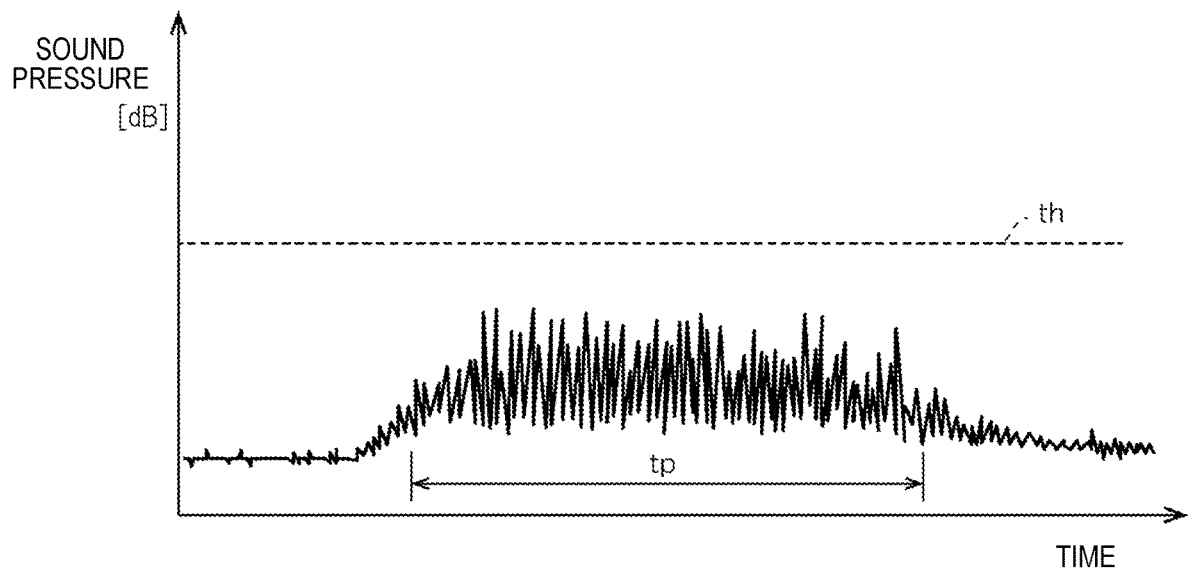
FIG. 3 is a waveform diagram illustrating an example of temporal change of a normal vibration sound emitted from an inspection object.

FIG. 3 is a waveform diagram illustrating an example of temporal change of the normal vibration sound emitted from the inspection object. A vertical axis in FIG. 3 represents a sound pressure level, and a horizontal axis in FIG. 3 represents time. When the vibration sound is normal, for example, in a section tp where the product, which is the inspection object, is activated, the vibration sound illustrates a substantially uniform sound pressure level at or below a threshold th.

Figure 4:
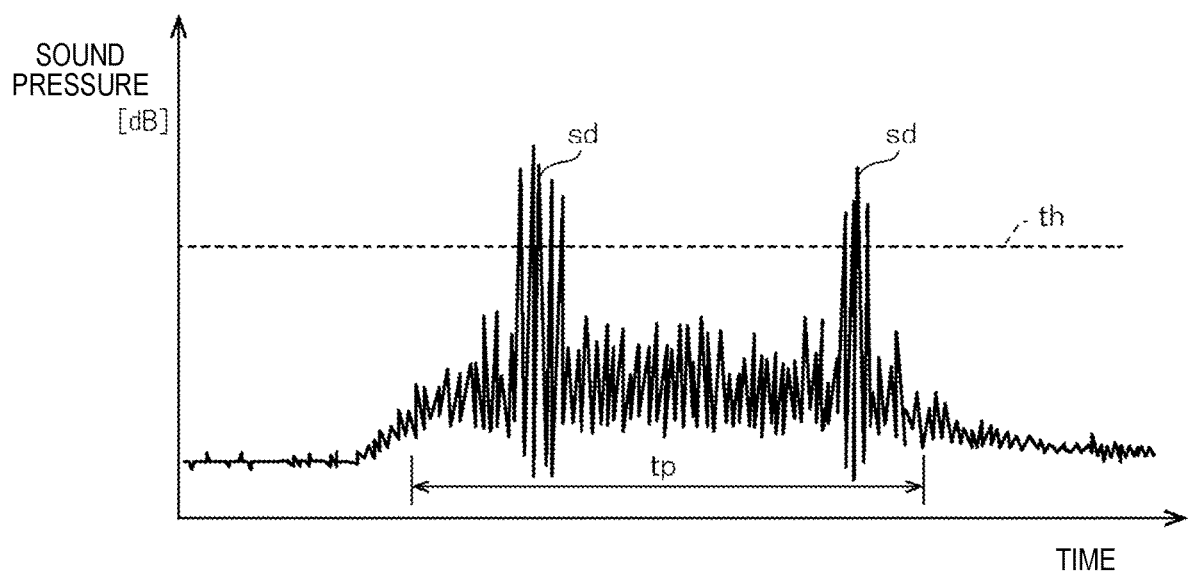
FIG. 4 is a waveform diagram illustrating an example of temporal change of an abnormal vibration sound emitted from the inspection object.

FIG. 4 is a waveform diagram illustrating an example of temporal change of the abnormal vibration sound emitted from the inspection object. A vertical axis in FIG. 4 represents a sound pressure level, and a horizontal axis in FIG. 4 represents time. When the vibration sound is abnormal, for example, in FIG. 4, a large vibration sound sd whose sound pressure level exceeds the threshold th is intermittently (irregularly) generated in the section tp similar to that in FIG. 3.

Here, an irregular abnormal sound, that is, an abnormal sound generated irregularly is illustrated as the abnormal vibration sound, but the same applies to an abnormal sound that generates a loud sound regularly. These vibration sounds are represented by a graph illustrating the sound pressure level with respect to the time axis. In this case, since the vibration sound includes a loud sound exceeding the threshold, the vibration sound is determined to be an abnormal sound. When the abnormal sound includes a specific frequency component, the vibration sound is represented by a graph illustrating a sound pressure level with respect to a frequency axis. In this case, even if the sound pressure level is less than the threshold, the vibration sound is determined to be an abnormal sound since the vibration sound includes the specific frequency component. The determination of the abnormal sound may be performed based on the sound pressure level with respect to not only one of the time axis and the frequency axis but also both of the time axis and the frequency axis.

(Calculation of Measurement Time)

Figure 5:
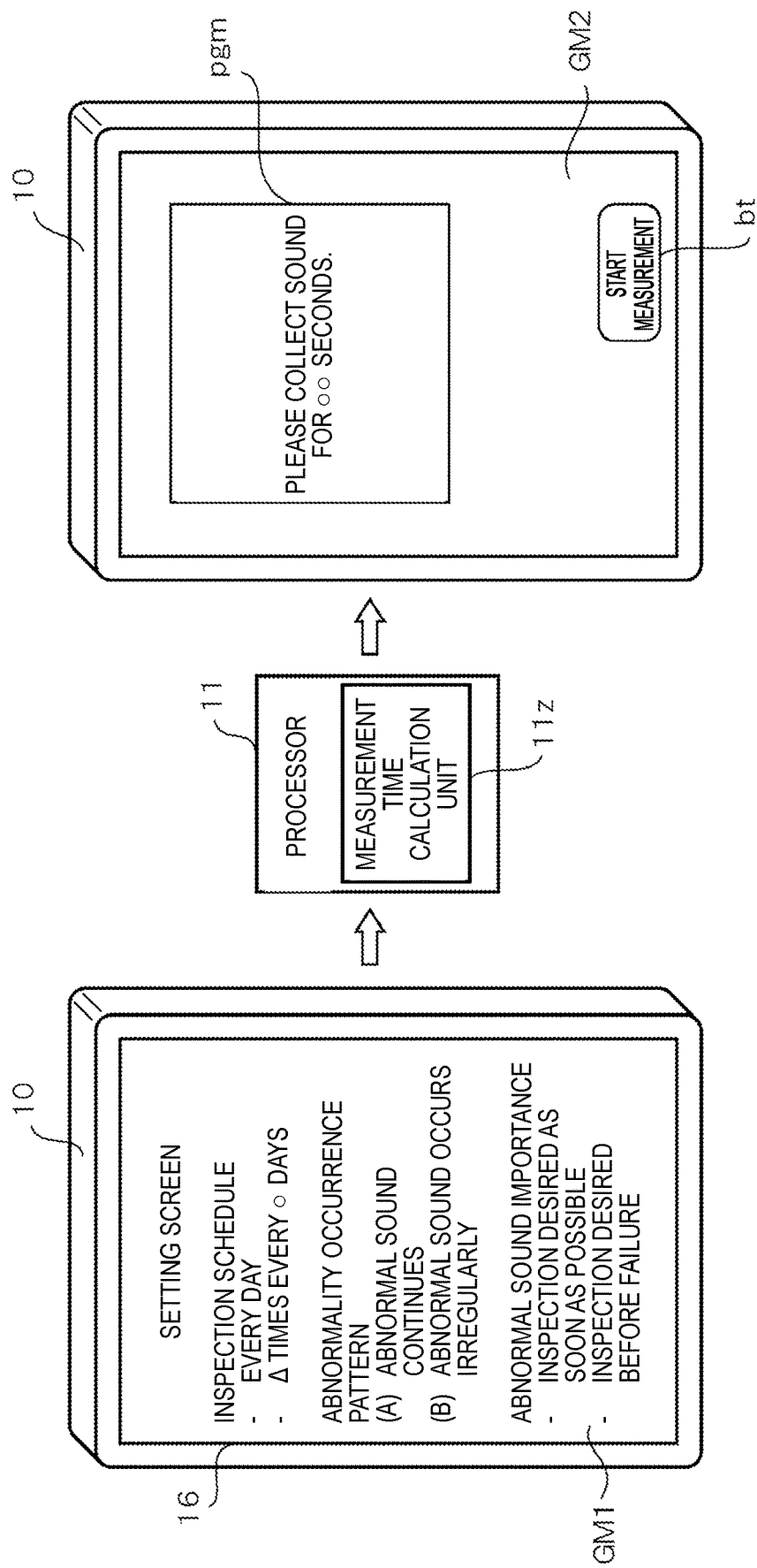
FIG. 5 is a diagram illustrating an example of an outline of operation of a measurement terminal.

FIG. 5 is a diagram illustrating an example of an outline of operation of the measurement terminal 10. The display 16 of the measurement terminal 10 displays a setting screen GM1 for setting the setting information for each inspection object in accordance with an instruction from the processor 11. Three selection items of an inspection schedule, an abnormality occurrence pattern, and an abnormal sound importance are displayed on the setting screen GM1. In selection items of the inspection schedule, "every day" indicating that the inspection is performed every day and "Δ times every ○ days" indicating that the inspection is performed every predetermined number of days can be selected. Examples of "Δ times every ○ days" include "once every two days". Note that "once every three days", "once every four days", or the like may be selected.

In selection items of the abnormality occurrence pattern, "an abnormal sound continues" indicating that the abnormal sound occurs regularly and "the abnormal sound occurs irregularly" indicating that an abnormal sound occurs irregularly can be selected.

In selection items of the abnormal sound importance, it is possible to select "I want to inspect the inspection object as soon as possible" indicating that the inspection object has a high importance and "I want to inspect the inspection object before a failure" indicating that the inspection object has a low importance.

The inspector hm can select the selection item by touching the selection items displayed on the display 16 of the touchscreen TP with a finger.

When the processor 11 receives a selection operation on the setting screen GM1 performed by the inspector hm via the input device 17 of the touchscreen TP, the processor 11 creates the setting information for each inspection object. The processor 11 has a function of a measurement time calculation unit 11z that can be implemented in cooperation with the memory 12, and calculates measurement time Tm, which is time during which the microphone 13 continues to collect sound in accordance with the created setting information.

When the inspection application is activated by the processor 11, the display 16 displays an inspection screen GM2. A measurement start button bt is displayed on the inspection screen GM2. In accordance with an instruction from the processor 11, the display 16 displays a pop-up screen pgm that prompts sound collection at the start of measurement in accordance with an instruction from the processor 11. On the pop-up screen pgm, for example, a message of "Please collect sound for ∞ seconds" is displayed. Upon pressing the measurement start button bt in response to this message, the inspector hm starts collecting the sound by the microphone 13.

Figure 6:
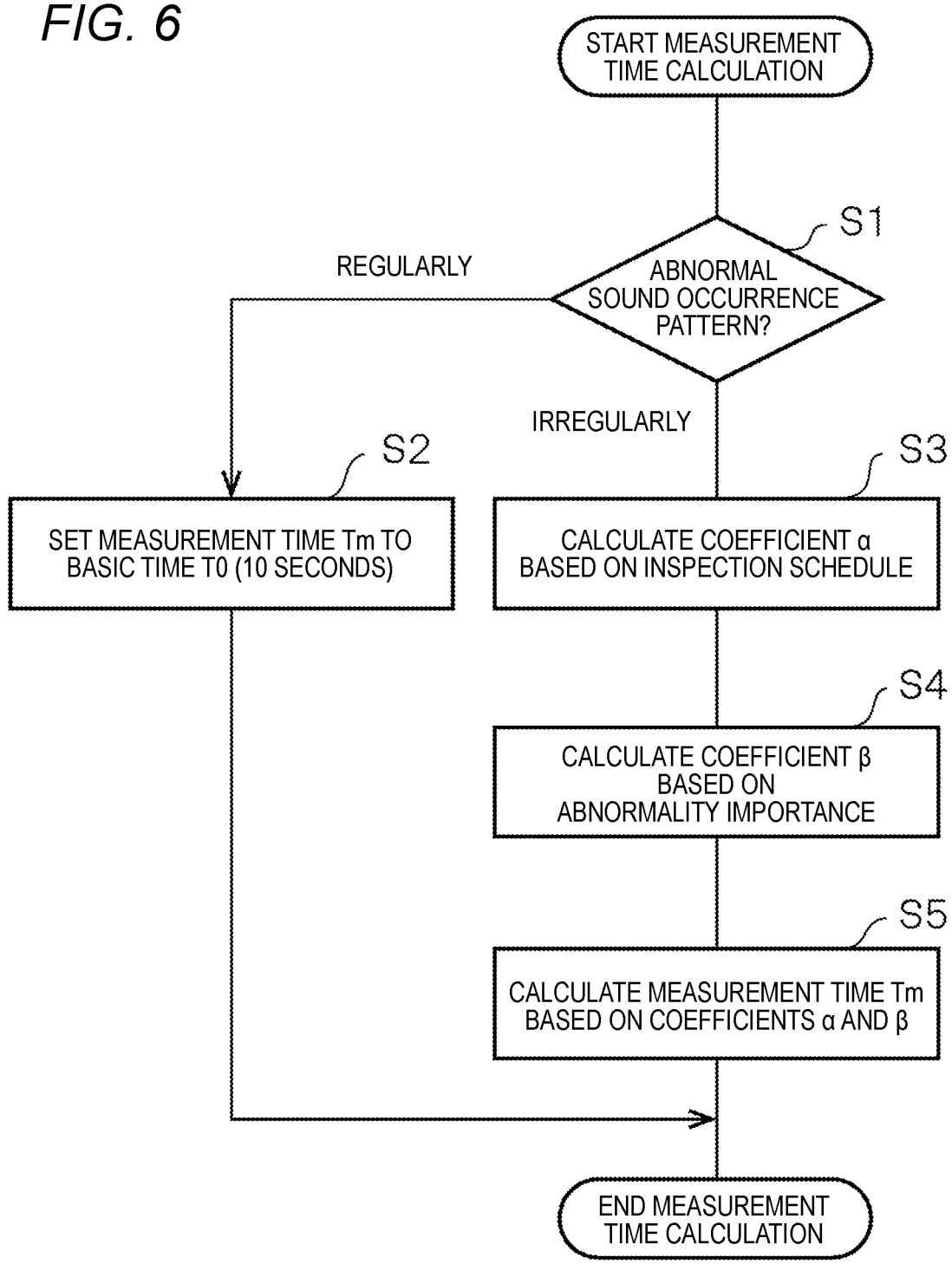
FIG. 6 is a flowchart illustrating an example of an operation procedure of measurement time calculation processing of the measurement terminal according to the first embodiment.

FIG. 6 is a flowchart illustrating an example of an operation procedure of measurement time calculation processing of the measurement terminal 10 according to the first embodiment. As a premise of the description of FIG. 6, the measurement time calculation application installed in advance in the measurement terminal 10 has already been started. The calculation of the measurement time Tm is performed for each inspection object. In order to calculate the measurement time Tm, the inspector hm collects the vibration sound emitted from the product, which is the inspection object, in advance by the microphone 13. When the vibration sound is collected by the microphone 13, the processor 11 temporarily stores the audio data of the vibration sound in the memory 12.

The processor 11 determines whether the audio data stored in the memory 12 for measurement time calculation is a sound occurring regularly (that is, a stationary sound) or a sound occurring irregularly (that is, a non-stationary sound) (S1).

When the sound is a stationary sound (S1, stationary), the processor 11 sets the measurement time Tm to a basic time T0 (for example, 10 seconds) (S2). The basic time T0 may be a fixed value regardless of the product, which is the inspection object, or a different value for each product. Thereafter, the processor 11 ends the measurement time calculation processing illustrated in FIG. 6.

On the other hand, when the sound is a non-stationary sound in step S1 (S1, non-stationary), the processor 11 calculates a parameter for calculating the measurement time Tm. Specifically, the processor 11 calculates a coefficient α based on the inspection schedule provided in the setting information for each inspection object (S3). The coefficient α is a value in a range of 0 to 1. For example, the value is 1.0 when inspection is performed every day, and the value is 0.5 when inspection is performed once every two days. The larger the number of inspections, the larger the value of the coefficient α.

The processor 11 calculates a coefficient β based on the abnormal sound importance provided in the setting information for each inspection object (S4). The coefficient β may be any value. For example, in a case where the inspection object is of high importance and the inspection is desired to be performed as soon as possible, a value of 5 is used, and in a case where the inspection object is not of great importance and only needs to be inspected before a failure occurs, a value of 1 is used. Therefore, for the inspection object of high importance that causes an adverse effect when a failure occurs, the coefficient β is set to the large value of 5 such that the presence or absence of a failure portion can be quickly and accurately determined and repair can be quickly performed. On the other hand, for the inspection object of low importance that does not cause much adverse effect even if a failure occurs, since the inspection only needs to be performed before the failure, the degree of urgency is low, and the coefficient β is set to the small value of 1.

The processor 11 calculates the measurement time Tm according to Equation (1) using the coefficients α, β (S5).

[Equation 1]

$$Tm = T0 \times \alpha \times \beta \qquad (1)$$

In Equation (1), the basic time T0 is set to the same value as the time set for the stationary abnormal sound in step S2 (for example, 10 seconds). The basic time T0 may be set to a value different from the time set for the stationary abnormal sound. Further, although the basic time T0 is the fixed value (for example, 10 seconds), the basic time T0 may be set to a different value for each product, which is the inspection object.

In step S5, the processor 11 registers the coefficients α, β and the measurement time Tm calculated for each product, which is the inspection object, in the parameter table 90 stored in the recording device 14.

FIG. 7 is a table illustrating an example of registered contents in the parameter table 90. The parameter table 90 is stored in the recording device 14. The coefficients α, β and the calculated measurement time Tm are registered in the parameter table 90 for each product, which is the inspection object. Here, two products AAA, BBC are registered as the air conditioning fan 102, which is the inspection object. Two products KMK, MMM are registered as the compressor 101. One product PPP is registered as the heat pump 103. For example, the coefficients α, β and the measurement time Tm of the product AAA of the air conditioning fan 102 are 1, 5, and 50 seconds, respectively.

(Inspection Operation)

Figure 8:
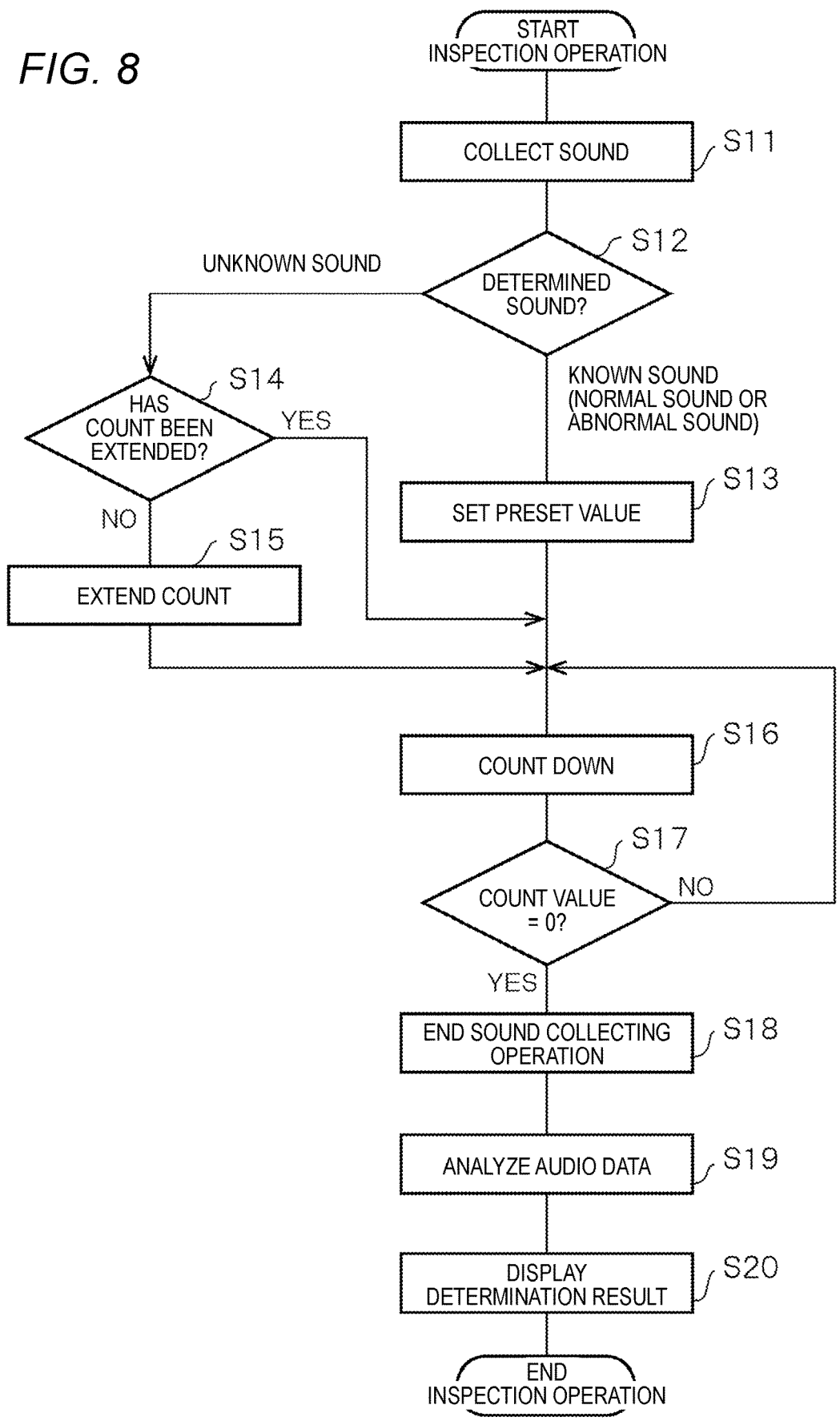
FIG. 8 is a flowchart illustrating an example of an operation procedure of inspection processing of the measurement terminal according to the first embodiment.

FIG. 8 is a flowchart illustrating an example of an operation procedure of inspection processing of the measurement terminal 10 according to the first embodiment. As a premise of the description of FIG. 8, the inspection application installed in advance in the measurement terminal 10 has already been started. When starting the inspection, the inspector hm approaches the inspection object and directs the measurement terminal 10 at the inspection object in order to collect the sound. When the inspector hm presses the measurement start button bt displayed on the display 16 of the measurement terminal 10, the processor 11 starts the inspection operation.

First, the processor 11 instructs the microphone 13 to start sound collection, and starts a count operation of the timer counter 18. The microphone 13 collects ambient sound including the vibration sound emitted from the inspection object, and generates the audio data (S11). The processor 11 temporarily stores the audio data output from the microphone 13 in the memory 12. Here, in order to determine the audio data in step S12, audio data for a certain period of time (for example, 10 seconds) shorter than the measurement time Tm is stored. Alternatively, audio data corresponding to the measurement time Tm necessary for analyzing the audio data in step S19 may be stored. That is, the processor 11 may proceed to the processing of step S12 and subsequent steps after acquiring the audio data for a period of time necessary for the analysis.

The processor 11 determines the sound collected by the microphone 13 (S12). In the determination of the sound, it is determined whether the collected sound is a known normal sound, a known abnormal sound, or an unknown sound. In the determination of the sound, for example, pattern matching of the audio data is performed. The audio data of the normal sound and the audio data of the abnormal sound are registered in the recording device 14. As a result of the pattern matching, when the collected audio data matches the audio data (including the audio data of the normal sound and the audio data of the abnormal sound) registered in the recording device 14, it is determined that the sound is a sound of known audio data.

On the other hand, when the collected audio data does not match the audio data registered in the recording device 14, it is determined that the sound is a sound of unknown audio data. The unknown audio data is audio data that is not registered in the recording device 14. Examples of the audio data that is not registered include audio data such as an abnormal sound that has not occurred in the past, ambient noise, wind noise, or the like. The determination of the sound may be performed in a state where the audio data is stored for a predetermined time (however, less than the measurement time Tm), or may be sequentially performed. For example, in a case where the audio data includes the specific frequency component, it is possible to immediately determine whether the sound is a known sound even in a short time.

When it is determined in step S12 that the sound is a known normal sound or a known abnormal sound (S12, known sound), the processor 11 reads the measurement time Tm corresponding to the inspection object, which is calculated in the measurement time calculation processing of FIG. 6 and registered in the parameter table 90, and sets the measurement time Tm as the preset value in the timer counter 18 (S13).

On the other hand, when it is determined in step S12 that the sound is an unknown sound (S12, unknown sound), the processor 11 determines whether the count of the preset value has been extended (S14). When the count has not been extended (S14, NO), the processor 11 reads the measurement time Tm corresponding to the inspection object registered in the parameter table 90, and sets the time obtained by adding an extension time to the measurement time Tm as a preset value in the timer counter 18 (S15). On the other hand, when the count has been extended (S14, YES), the processing of the processor 11 proceeds to step S16.

After the processing of step S13 or step S15, the processor 11 starts counting down the timer counter 18 (S16). The processor 11 determines whether the count value of the timer counter 18 has reached 0 and a time up signal has been input from the timer counter 18 (S17). When the count value has not reached 0 (S17, NO), that is, when the measurement time Tm has not passed, the processer 11 returns the processing to step S16 and continues the sound collecting operation by the microphone 13 until the count value reaches 0.

On the other hand, when the count value has reached 0 in step S17 (S17, YES), the processor 11 ends the sound collecting operation by the microphone 13 on an assumption that the audio data necessary for the inspection can be stored (S18). The processor 11 analyzes the audio data based on the audio data for the measurement time Tm stored in the memory 12 (S19).

When analyzing the audio data in step S18, the processor 11 uses artificial intelligence (AI). The processor 11 is equipped with artificial intelligence, learns various kinds of abnormal audio data for each inspection object in advance by machine learning such as deep learning, and generates a learned model obtained as a result of learning. The processor 11 inputs the collected audio data to the learned model, and outputs a determination result of normality or abnormality of the inspection object. When there is an abnormality, the determination result may include information such as a degree of the abnormality, an abnormality location, and a cause of the abnormality. Further, the determination result may include information such as the necessity of repair and the degree of urgency. As described above, the processor 11 mechanically analyzes the audio data collected by using the learned model generated or updated by machine learning in advance, thereby improving an accuracy in determining the presence or absence of an abnormality in the inspection object in the measurement terminal 10. The machine learning for generating the learned model may be performed using one or more statistical classification techniques. Examples of the statistical classification techniques include linear classifiers, support vector machines, quadratic classifiers, kernel density estimation, decision trees, artificial neural networks, Bayesian technologies and/or networks, hidden Markov models, binary classifiers, multi-class classifiers, a clustering technique, a random forest technique, a logistic regression technique, a linear regression technique, a gradient boosting technique, or the like. However, the statistical classification technique to be used is not limited thereto.

In the analysis of the audio data in step S19, pattern matching of the audio data may be performed as in step S12, instead of using artificial intelligence. However, the pattern matching of the audio data in step S19 is performed in more detail than the determination of the audio data performed in step S12. For example, a huger amount of audio data is registered in the recording device 14 than the amount of the audio data of the normal sound and the abnormal sound used for the determination of the audio data. In the pattern matching of the audio data in step S19, the huge amount of audio data is compared with the collected audio data. Accordingly, it is possible to accurately and precisely determine the presence or absence of an abnormality in the inspection object.

The processor 11 displays the determination result of the presence or absence of an abnormality in the inspection object on the display 16 (S20). The inspector hm visually recognizes the determination result of the presence or absence of an abnormality displayed on the display 16. Thereafter, the processor 11 ends the inspection processing illustrated in FIG. 8.

As described above, according to the measurement terminal 10 according to the first embodiment or the measurement method performed by the measurement terminal 10, the microphone 13 (an example of an acquisition unit) collects the ambient sound including the vibration sound emitted from the inspection object and generates (that is, acquires) the audio data. The memory 12 stores, for each inspection object, the setting information including the coefficient $\alpha$ based on the inspection schedule of the inspection object and the coefficient $\beta$ based on the abnormality importance (an example of parameters related to the features of the inspection and the abnormality). The processor 11 (an example of a derivation unit) calculates (that is, derives) the measurement time Tm (an example of a time required to acquire audio data from the inspection object) used to determine the presence or absence of an abnormality in the inspection object based on the setting information corresponding to the inspection object. The processor 11 (an example of an analysis unit) determines the presence or absence of an abnormality in the inspection object based on the audio data from the inspection object for the calculated measurement time Tm.

Accordingly, the measurement terminal 10 according to the first embodiment can derive an appropriate measurement time of the measurement data for determining the presence or absence of the abnormality, and support rapid and efficient determination of the presence or absence of an abnormality in consideration of features of respective parameters of the inspection and the abnormality in each inspection object.

Further, the processor 11 (an example of a control unit) displays, on the display 16, an indication prompting acquisition of audio data from the inspection object for the calculated measurement time Tm (an example of required time). The processing of the indication prompting the acquisition of the audio data is executed, for example, before the determination of the presence or absence of an abnormality in the inspection object in the measurement terminal 10. Accordingly, the inspector hm can visually and easily grasp timing for starting the measurement.

Further, the setting information includes the inspection schedule of the inspection object, the abnormality occurrence pattern of the inspection object, and the importance related to the occurrence of an abnormality in the inspection object. Accordingly, the measurement terminal 10 can calculate the appropriate measurement time in accordance with the operation state of the inspection object.

When the processor 11 sequentially receives the audio data of sound from the inspection object as an input and receives the audio data of sound from the inspection object as an input for the calculated measurement time Tm, the processor 11 displays, on the display 16, the determination result of the presence or absence of an abnormality based on the audio data for the measurement time Tm. Accordingly, the inspector hm can visually grasp the presence or absence of an abnormality in the inspection object.

The measurement terminal 10 can be carried by the inspector hm (a user). Accordingly, when the inspector hm goes around and inspects a plurality of inspection objects (air conditioning fans, compressors, or the like) installed in the building, the inspector hm can easily move to a place where the inspection objects are installed. Further, the inspector hm can easily operate the measurement terminal 10.

Further, the recording device 14 (an example of a memory) stores the calculated measurement time Tm for each inspection object. As described above, by registering the calculated measurement time for each inspection object in the recording device at a time, the measurement terminal 10 can read and use the registered measurement time when inspecting the inspection object. Accordingly, the measurement terminal 10 can save time and effort of calculating the measurement time each time the inspection object is inspected, and can improve the work efficiency of the inspector hm.

Further, the processor 11 registers the audio data of the normal sound determined as having no abnormality and the audio data of the abnormal sound determined as having an abnormality in the recording device 14 in advance, and extends the measurement time Tm during which the sound is collected by the microphone 13 when the audio data of the sound sequentially input (that is, sequentially collected) by the microphone 13 does not match any of the audio data of the normal sound and the audio data of the abnormal sound registered in the recording device 14. Accordingly, even when the measurement terminal 10 inputs audio data (that is, unknown audio data) that is not registered by the measurement terminal 10 from the inspection object, by extending the measurement time Tm, it is more likely to detect audio data that matches the pattern of the audio data of the normal sound or the pattern of the audio data of the abnormal sound that are registered, and the unknown audio data can be dealt with efficiently.

Further, the processor 11 derives the required time so as to lengthen and shorten the length of the measurement time Tm in accordance with an appearance frequency of the abnormal sound collected by the microphone 13. Accordingly, when it is determined that the appearance frequency of the abnormal sound of the inspection object is high and the possibility of a failure is high, the measurement terminal 10 can extend the measurement time and generate the audio data of the vibration sound. Further, the measurement terminal 10 can accurately determine the presence or absence of an abnormality in the inspection object based on the audio data of the collected vibration sound. On the other hand, when it is assumed that the appearance frequency of the abnormal sound in the inspection object is low and the possibility of a failure is low, the measurement terminal 10 can shorten the measurement time and improve the efficiency of the inspection.

Further, the processor 11 determines the presence or absence of an abnormality in the inspection object by mechanically analyzing the audio data collected by the microphone 13 using the learned model that is generated or updated by machine learning (for example, machine learning using the statistical classification technique described above) in advance and stored in the measurement terminal 10. Accordingly, the measurement terminal 10 can improve the accuracy in determining the presence or absence of an abnormality in the inspection object.

(First Modification)

Since a configuration of the measurement terminal 10 in a first modification is the same as that of the measurement terminal 10 according to the first embodiment, a description of duplicate contents will be simplified or omitted, and different contents will be described.

In the first embodiment described above, the measurement time Tm is calculated by multiplying the basic time T0 by the coefficient α based on the inspection schedule and the coefficient β based on the abnormal sound importance. In the first modification, when the appearance frequency of the abnormal sound that occurs irregularly is known in advance, a coefficient γ corresponding to the appearance frequency is set, and the measurement time Tm is calculated according to Equation (2) in consideration of the coefficient γ.

[Equation 2]

$$Tm = 10 \times \alpha \times \beta \times \gamma \qquad (2)$$

Accordingly, the measurement terminal 10 can determine the length of the measurement time in accordance with the appearance frequency of the abnormal sound. For example, the coefficient γ may be set to a large value when the appearance frequency of the abnormal sound of the inspection object is high, and the coefficient γ may be set to a small value when the appearance frequency of the abnormal sound of the inspection object is low. For the abnormal sound whose appearance frequency is high, it is highly probable that a failure will occur, and sound collection time is lengthened, so that audio data can be analyzed accurately. On the other hand, for the abnormal sound whose appearance frequency is low, it is determined that there is little concern that a failure will occur immediately, and the measurement time is shortened.

Conversely, the coefficient γ may be set to a small value when the appearance frequency of the abnormal sound of the inspection object is high, and the coefficient γ may be set to a large value when the appearance frequency of the abnormal sound of the inspection object is low. For an abnormal sound whose appearance frequency is high, the audio data of the abnormal sound can be collected even if the sound collection time is short. On the other hand, for an abnormal sound whose appearance frequency is low, the probability that the audio data of the abnormal sound can be collected is high.

(Second Modification)

In the first embodiment described above, the measurement terminal collects the sound emitted from the inspection object, analyzes the audio data, and determines the presence or absence of an abnormality in the inspection object based on the audio data. In the second modification, a case is illustrated where a cloud server, which is an external device, analyzes audio data of a sound collected by the measurement terminal, and determines the presence or absence of an abnormality in the inspection object based on the audio data.

Since a configuration of the measurement terminal 10 in the second modification is the same as that of the measurement terminal 10 according to the first embodiment, a description of duplicate contents will be simplified or omitted, and different contents will be described.

In the second modification, as in the measurement terminal 10 according to the first embodiment, the cloud server 40 receives and acquires, from the measurement terminal 10, audio data of an inspection object collected by the microphone 13 of the measurement terminal 10. The cloud server 40 analyzes the received audio data of the inspection object to determine the presence or absence of an abnormality in the inspection object, and transmits the determination result to the measurement terminal 10.

The cloud server 40 includes the processor 41, the memory 42, the recording device 44, and the communication circuit 45.

When the inspector hm inspects the inspection object, the processor 41 calculates the measurement time of the sound to be collected by the microphone 13 during the execution of the measurement time calculation application in the measurement terminal 10. During the execution of the inspection application by the measurement terminal 10, the processor 41 performs the inspection operation of the inspection object using the audio data of the inspection object transmitted from the measurement terminal 10. The processor 41 is configured by using, for example, a central processing unit (CPU), a microprocessor unit (MPU), a digital signal processor (DSP), or a field-programmable gate array (FPGA), or the like.

The memory 42 includes a random access memory (RAM), and temporarily stores audio data of sound from the inspection object received by the communication circuit 45. The memory 42 includes a read only memory (ROM), and stores a program and data for defining processing of the processor 41.

The recording device 44 (an example of a memory) stores normal audio data and abnormal audio data to be compared with the audio data collected by the measurement terminal 10. The recording device 44 stores the parameter table 90 in which different parameters and a different measurement time are registered for each inspection object. The recording device 44 includes, for example, a solid state drive (SSD), a hard disk drive (HDD), a rewritable ROM (for example, an electrically erasable programmable read-only memory (EEPROM)), or the like.

The communication circuit 45 is connected to the network NW via, for example, a wireless local area network (LAN), a mobile communication network (for example, a cellular network such as a fourth generation mobile communication system (4G) or a fifth generation mobile communication system (5G)), and can communicate with the measurement terminal 10 or the storage 50.

Figure 9:
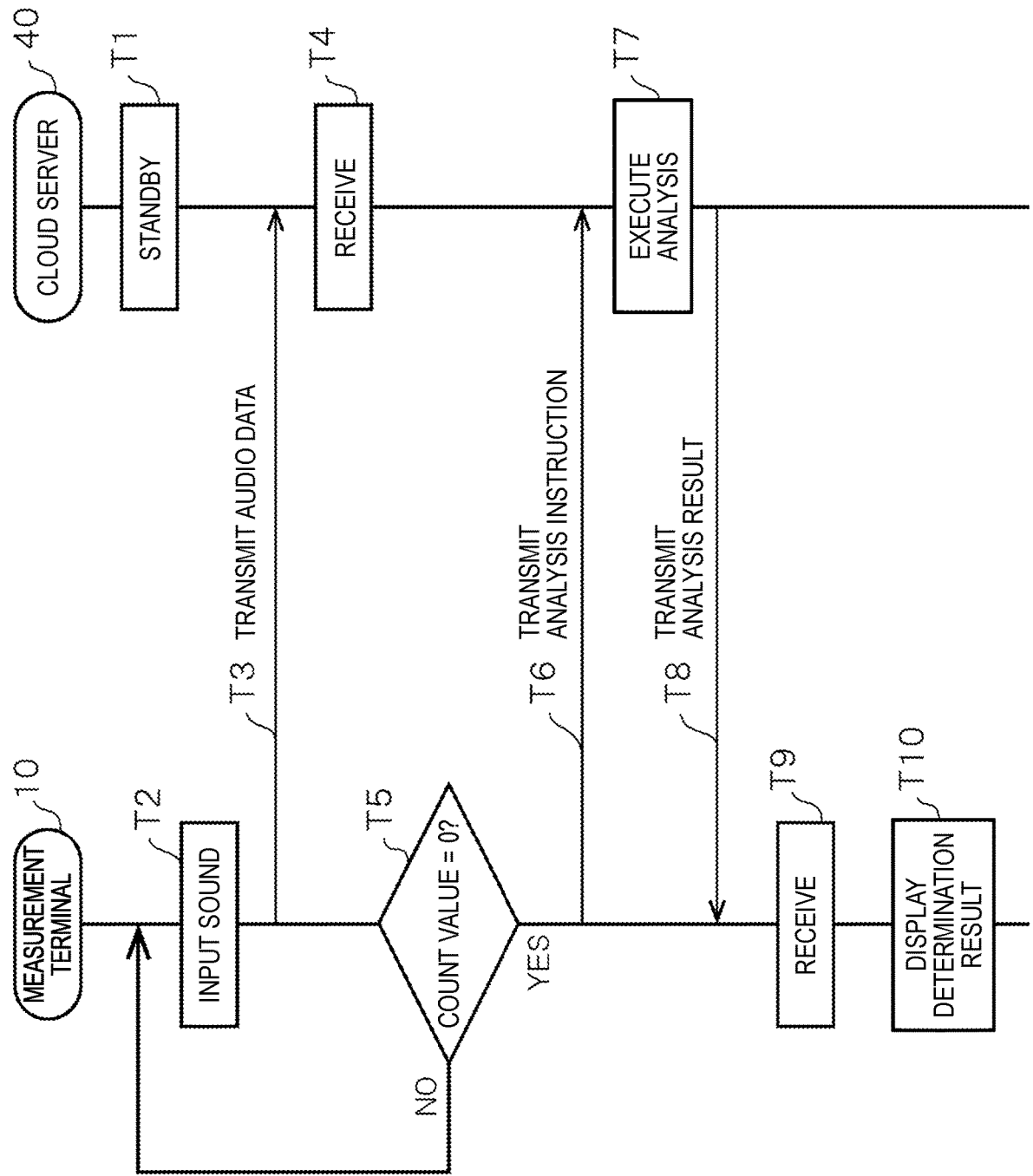
FIG. 9 is a sequence diagram illustrating an example of an operation procedure of a sound inspection system according to a second modification.

FIG. 9 is a sequence diagram illustrating an operation procedure of the sound inspection system 5 according to the second modification. As a premise of the description of FIG. 9, the inspection application installed in advance in the measurement terminal 10 has already been started. The cloud server 40 is in a standby state (T1) in which the cloud server 40 waits until receiving audio data from the measurement terminal 10. When starting the inspection, the inspector hm approaches the inspection object and directs the measurement terminal 10 at the inspection object. When the inspector hm presses the measurement start button bt displayed on the display 16 of the measurement terminal 10, the measurement terminal 10 collects the ambient sound including the vibration sound emitted from the inspection object by the microphone 13, and sequentially generates audio data (T2).

The measurement terminal 10 transmits the sequentially generated audio data to the cloud server 40 via the communication circuit 15 and the network NW (T3). The cloud server 40 receives the audio data transmitted from the measurement terminal 10 and stores the audio data in an internal memory (not illustrated) (T4).

The measurement terminal 10 determines whether the timer counter 18 reaches 0 and the measurement time Tm has passed (T5). When the timer counter 18 does not reach 0, the operation returns to procedure T2 and the measurement terminal 10 continues the sound collecting operation by the microphone 13.

When the timer counter 18 reaches 0 in procedure T5, the measurement terminal 10 transmits an analysis instruction to the cloud server 40 via the communication circuit 15 and the network NW (T6). When the cloud server 40 receives the analysis instruction from the measurement terminal 10 via the network NW, the cloud server 40 analyzes the audio data for the measurement time Tm stored in the internal memory (T7). The analysis may be the same as the analysis performed by the measurement terminal 10 in step S19 of the above embodiment, or may be a more detailed analysis. For example, when the analysis is performed using artificial intelligence, in a learned model generated by the cloud server 40, audio data stored in the storage 50 may be used in comparison with the measurement terminal 10, and it is assumed that the amount of learning is huge. Therefore, the generated learned model has a high processing accuracy. Accordingly, by analyzing the audio data collected by the measurement terminal 10 in the cloud server 40, the accuracy in determining the presence or absence of an abnormality in the inspection object in the cloud server 40 is improved. The machine learning for generating a learned model may be performed using one or more statistical classification techniques. Examples of the statistical classification techniques include linear classifiers, support vector machines, quadratic classifiers, kernel density estimation, decision trees, artificial neural networks, Bayesian technologies and/or networks, hidden Markov models, binary classifiers, multi-class classifiers, a clustering technique, a random forest technique, a logistic regression technique, a linear regression technique, a gradient boosting technique, or the like. However, the statistical classification technique to be used is not limited thereto.

The cloud server 40 transmits the analysis result to the measurement terminal 10 via the network NW (T8). The measurement terminal 10 receives the analysis result from the cloud server 40 via the communication circuit 15 and the network NW (T9). The analysis result includes a determination result of the presence or absence of an abnormality in the inspection object based on the audio data. The measurement terminal 10 displays the determination result on the display 16 (T10). The inspector hm grasps the determination result of the presence or absence of an abnormality in the inspection object displayed on the display 16, and moves to the next inspection object.

As described above, in the sound inspection system 5 (an example of a measurement system) according to the second modification, the measurement terminal 10 includes the processor 11 (an example of the acquisition unit) that acquires audio data of sound from the inspection object, and the communication circuit 15 (an example of a first communication unit) that transmits the acquired audio data of sound from the inspection object and the analysis instruction of the audio data and receives the determination result of the presence or absence of an abnormality based on the audio data of sound from the inspection object, and displays the received determination result on the display 16. The cloud server 40 (an example of an analysis device) includes the communication circuit 45 (an example of a second communication unit) that receives the audio data of sound from the inspection object and the analysis instruction from the measurement terminal 10 and transmits the determination result to the measurement terminal 10. In the cloud server 40, the memory 42 stores the setting information including the parameters related to the features of the inspection and the abnormality in the inspection object. The processor 41 (an example of a derivation unit) derives a time required to acquire the audio data of sound from the inspection object used to determine the presence or absence of an abnormality in the inspection object based on the setting information corresponding to the inspection object. The processor 41 (an example of an analysis unit) determines the presence or absence of an abnormality in the inspection object based on the audio data of sound from the inspection object for the derived required time.

As described above, the cloud server 40 analyzes the audio data, so that the analysis can be performed in more detail and with higher accuracy as compared with a case where the measurement terminal 10 performs the analysis of the audio data. Accordingly, the inspector hm can obtain a determination result with high accuracy for determining the presence or absence of an abnormality in the inspection object. Further, since the measurement terminal 10 does not need to perform analysis processing, the load of the processing on the measurement terminal 10 can be reduced, and the measurement terminal 10 can be provided as a simple and inexpensive device.

Further, in the cloud server 40, the processor 41 determines the presence or absence of an abnormality in the inspection object by mechanically and highly accurately analyzing the audio data collected by the microphone 13 of the measurement terminal 10 using the learned model that is generated or updated by machine learning (for example, machine learning using the statistical classification technique described above) in advance and stored in the cloud server 40. Accordingly, the cloud server 40 can further increase the accuracy in determining the presence or absence of the abnormality in the inspection object compared with the case where the measurement terminal 10 determines the presence or absence of the abnormality in the inspection object.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the various embodiments described above may be combined optionally in the range without deviating from the spirit of the invention.

For example, the measurement terminal 10 is preferably a device such as a smartphone, a tablet terminal, or a notebook PC that can be carried by the inspector hm, but may be a portable device that can be moved by being placed on a bogie or the like.

A program for realizing functions of the measurement terminal 10 according to the above-described embodiment that is applied to the measurement terminal, which is a computer, via a network or various storage media, and is read and executed by a processor of the measurement terminal, and a storage medium where the program is stored are also covered by an application range of the present disclosure. Further, a program for realizing functions of the cloud server 40 of the sound inspection system 5 according to the above-described embodiment to the cloud server 40, which is a computer, via a network or various storage media, and is read and executed by the processor 41 of the cloud server 40, and a storage medium where the program is stored are also covered by an application range of the present disclosure.

The present application is based on a Japanese patent application (Japanese Patent Application No. 2018-121556) filed on Jun. 27, 2018, contents of which are incorporated herein by reference.

INDUSTRIAL APPLICABILITY

The present disclosure can be used as a measurement terminal, a measurement method, and a program capable of deriving an appropriate measurement time of measurement data for determining the presence or absence of an abnormality in an inspection object, and support rapid and efficient determination of the presence or absence of an abnormality.

REFERENCE SIGNS LIST

5: sound inspection system
10: measurement terminal
11: processor
12: memory
13: microphone
14: recording device
15: communication circuit
16: display
17: input device
18: timer counter 40: cloud server
50: storage
TP: touchscreen

The invention claimed is:

1. A measurement terminal, comprising:
a storage that stores, for each of one or more inspection objects, setting information comprising a coefficient α based on an inspection schedule and a coefficient β based on an abnormality importance;
a processor; and
a memory having instructions that, when executed by the processor, cause the processor to perform operations, the operations comprising:
determining, based on audio data of sound received from an inspection object, an occurrence of an abnormal sound pattern;
deriving, based on the setting information and for the inspection object, the coefficient α corresponding to the inspection schedule;
deriving, based on the setting information and for the inspection object, the coefficient β corresponding to the abnormality importance;
calculating, based on a predetermined equation and in response to the determining of the occurrence of the abnormal sound pattern, a measurement time Tm for reacquiring the audio data of the sound from the inspection object to be used for determining a presence or absence of a failure in the inspection object; and
determining the presence or the absence of the failure in the inspection object based on the audio data of the sound from the inspection object based on the measurement time Tm,
wherein the coefficient α is a value in a range of 0 to 1, the coefficient β is a second value, and
the predetermined equation is:

$$Tm = T0 + \alpha \times \beta,$$

where T0 is a fixed value set for the inspection object.

2. The measurement terminal according to claim 1, wherein the operations further comprise:
displaying, on a display, an indication prompting acquisition of the audio data of the sound from the inspection object for the measurement time.

3. The measurement terminal according to claim 1, wherein the setting information comprises the inspection schedule of the inspection object, an abnormality occurrence pattern of the inspection object, and the abnormality importance related to occurrence of the failure in the inspection object.

4. The measurement terminal according to claim 1, wherein the determining the presence or the absence of the failure in the inspection object comprises: sequentially receiving the audio data of the sound from the inspection object as an input, and
wherein the operations further comprise: in a case where the audio data of the sound from the inspection object as the input for the measurement time is input, displaying, on a display, a determination result of the presence or the absence of the failure based on the audio data for the measurement time.

5. The measurement terminal according to claim 4, wherein the operations further comprise:
registering audio data of a normal sound determined as having no abnormality and audio data of an abnormal sound determined as having the abnormality in the memory, and
extending the measurement time in a case where the audio data sequentially received as the input does not match any of the audio data of the normal sound and the audio data of the abnormal sound.

6. The measurement terminal according to claim 1, wherein the calculating the measurement time comprises:
adjusting the measurement time so as to lengthen and shorten a length of the measurement time in accordance with an appearance frequency of the audio data of the abnormal sound pattern.

7. The measurement terminal according to claim 1, wherein the presence or the absence of the failure in the inspection object is determined using a learned model generated in advance by machine learning.

8. A measurement system comprising:
a measurement terminal comprising:
  a first communication device;
  a first processor; and
  a first memory having instructions that, when executed by the processor, cause the first processor to perform first operations, the first operations comprising:
    acquiring audio data of sound from an inspection object;
    transmitting, via the first communication device, the audio data of the sound from the inspection object and an analysis instruction of the audio data;
    receiving, via the first communication device, a determination result of a presence or an absence of a failure based on the audio data of the sound from the inspection object; and
    displaying the determination result on a display; and
an analysis device comprising:
  a storage that stores, for each of one or more inspection objects, setting information comprising a coefficient α based on an inspection schedule and a coefficient β based on an abnormality importance;
  a second communication device;
  a second processor; and
  a second memory having instructions that, when executed by the processor, cause the second processor to perform second operations, the second operations comprising:
    receiving, via the second communication device, the audio data of the sound from the inspection object and the analysis instruction from the measurement terminal;
    determining, based on the audio data of the sound received from the inspection object, an occurrence of an abnormal sound pattern;
    deriving, based on the setting information and for the inspection object, the coefficient α corresponding to the inspection schedule;
    deriving, based on the setting information and for the inspection object, the coefficient β corresponding to the abnormality importance;
    calculating, based on a predetermined equation and in response to an occurrence of an abnormal sound pattern, a measurement time Tm for reacquiring the audio data of the sound from the inspection object to be used for determining the presence or the absence of the failure in the inspection object;
    determining the presence or the absence of the failure in the inspection object based on the audio data of the sound from the inspection object based on the measurement time Tm; and transmitting, via the second communication device, the determination result to the measurement terminal, wherein the coefficient α is a value in a range of 0 to 1, the coefficient β is a second value, and the predetermined equation is:

$$Tm = T0 \times \alpha \times \beta,$$

where T0 is a fixed value set for the inspection object.

9. The measurement system according to claim 8, wherein the presence or the absence of the failure in the inspection object is determined using a learned model generated in advance by machine learning.

10. A measurement method, comprising:
acquiring audio data of sound from an inspection object;
accessing a storage that stores, for each of one or more inspection objects, setting information comprising a coefficient α based on an inspection schedule and a coefficient β based on an abnormality importance;
determining, based on the audio data of the sound acquired from the inspection object, an occurrence of an abnormal sound pattern;
deriving, based on the setting information and for the inspection object, the coefficient α corresponding to the inspection schedule;
deriving, based on the setting information and for the inspection object, the coefficient β corresponding to the abnormality importance;
calculating, based on a predetermined equation and in response to the determining of the occurrence of the abnormal sound pattern, a measurement time Tm for reacquiring the audio data of the sound from the inspection object to be used for determining a presence or an absence of a failure in the inspection object; and
determining the presence or the absence of the failure in the inspection object based on the audio data of the sound from the inspection object based on the measurement time Tm,
wherein the coefficient α is a value in a range of 0 to 1, the coefficient β is a second value, and the predetermined equation is:

$$Tm = T0 \times \alpha \times \beta,$$

where T0 is a fixed value set for the inspection object.

11. The measurement method according to claim 10, further comprising:
displaying, on a display, an indication prompting acquisition of the audio data of the sound from the inspection object for the measurement time, prior to the determining the presence or the absence of the failure in the inspection object.

12. The measurement method according to claim 10, wherein the setting information comprises the inspection schedule of the inspection object, an abnormality occurrence pattern of the inspection object, and the abnormality importance related to occurrence of the failure in the inspection object.

13. The measurement method according to claim 10, wherein the determining the presence or the absence of the failure in the inspection object comprises: sequentially receiving the audio data of the sound from the inspection object as an input, and wherein the measurement method further comprises: in a case where the audio data of the sound from the inspection object for the measurement time is input, displaying, on a display, a determination result of the presence or the absence of the failure based on the audio data for the measurement time.

14. The measurement method according to claim 10, further comprising:
registering audio data of a normal sound determined as having no abnormality and audio data of an abnormal sound determined as having an abnormality in the storage; and
extending the measurement time in a case where the audio data sequentially received as the input does not match any of the audio data of the normal sound and the audio data of the abnormal sound.

15. The measurement method according to claim 10, wherein the calculating the measurement time comprises:
adjusting the measurement time so as to lengthen and shorten a length of the measurement time in accordance with an appearance frequency of the audio data of the abnormal sound pattern.

16. The measurement method according to claim 10, wherein the presence or the absence of the failure in the inspection object is determined using a learned model generated in advance by machine learning.

17. A non-transitory computer-readable medium storing a program that, when executed by a processer, causes a measurement terminal, which is a computer, to execute operations, the operations comprising:
acquiring audio data of sound from an inspection object;
accessing a storage that stores, for each of one or more inspection objects, setting information comprising a coefficient α based on an inspection schedule and a coefficient β based on an abnormality importance;
determining, based on the audio data of the sound acquired from the inspection object, an occurrence of an abnormal sound pattern;
deriving, based on the setting information and for the inspection object, the coefficient α corresponding to the inspection schedule;
deriving, based on the setting information and for the inspection object, the coefficient β corresponding to the abnormality importance;
calculating, based on a predetermined equation and in response to the determining of the occurrence of the abnormal sound pattern, a measurement time Tm for reacquiring the audio data of the sound from the inspection object to be used for determining a presence or an absence of a failure in the inspection object; and
determining the presence or the absence of the failure in the inspection object based on the audio data of the sound from the inspection object based on the measurement time Tm,
wherein the coefficient α is a value in a range of 0 to 1, the coefficient β is a second value, and the predetermined equation is:

$$Tm = T0 \times \alpha \times \beta,$$

where T0 is a fixed value set for the inspection object.

18. The program according to claim 17, wherein the determining the presence or the absence of the failure in the inspection object is executed using a learned model generated in advance by machine learning and stored in the measurement terminal.

19. A non-transitory computer-readable medium storing a program that, when executed by a processor, causes an analysis device, which is a computer, to execute operations, the analysis device configuring a measurement system together with a measurement terminal, the measurement terminal being configured to acquire audio data of sound from an inspection object, transmit the acquired audio data of the sound from the inspection object and an analysis instruction of the audio data, receive a determination result of a presence or an absence of a failure based on the audio data of the sound from the inspection object, and display the determination result on a display, the operations comprising:

receiving the audio data of the sound from the inspection object and the analysis instruction of the audio data from the measurement terminal;

determining, based on audio data of the sound received from the inspection object, an occurrence of an abnormal sound pattern;

accessing a storage that stores, for each of one or more inspection objects, setting information comprising a coefficient $\alpha$ based on an inspection schedule and a coefficient $\beta$ based on an abnormality importance;

deriving, based on the setting information and for the inspection object, the coefficient $\alpha$ corresponding to the inspection schedule;

deriving, based on the setting information and for the inspection object, the coefficient $\beta$ corresponding to the abnormality importance;

calculating, based on a predetermined equation and in response to an occurrence of an abnormal sound pattern, a measurement time Tm for reacquiring the audio data of the sound from the inspection object to be used for determining the presence or the absence of the failure in the inspection object;

determining the presence or the absence of the failure in the inspection object based on the audio data of the sound from the inspection object based on the measurement time Tm; and transmitting the determination result of the presence or the absence of the failure based on the audio data of the sound from the inspection object to the measurement terminal, wherein the coefficient $\alpha$ is a value in a range of 0 to 1, the coefficient is a second value, and
the predetermined equation is:

$$Tm = T0 \times \alpha \times \beta,$$

where T0 is a fixed value set for the inspection object.

20. The program according to claim 19, wherein the determining the presence or the absence of the failure in the inspection object is executed using a learned model generated in advance by machine learning and stored in the analysis device.

\* \* \* \* \*